US011835356B2

(12) United States Patent
Shen

(10) Patent No.: US 11,835,356 B2
(45) Date of Patent: Dec. 5, 2023

(54) INTELLIGENT TRANSPORTATION ROAD NETWORK ACQUISITION METHOD AND APPARATUS, ELECTRONIC DEVICE AND STORAGE MEDIUM

(71) Applicant: APOLLO INTELLIGENT CONNECTIVITY (BEIJING) TECHNOLOGY CO., LTD., Beijing (CN)

(72) Inventor: Donghui Shen, Beijing (CN)

(73) Assignee: APOLLO INTELLIGENT CONNECTIVITY (BEIJING) TECHNOLOGY CO., LTD., Beijing (CN)

( * ) Notice: Subject to any disclaimer, the term of this patent is extended or adjusted under 35 U.S.C. 154(b) by 119 days.

(21) Appl. No.: 17/676,686

(22) Filed: Feb. 21, 2022

(65) Prior Publication Data
US 2022/0404168 A1 Dec. 22, 2022

(30) Foreign Application Priority Data
Jun. 21, 2021 (CN) .......................... 202110687714.4

(51) Int. Cl.
G01C 21/00 (2006.01)
G06F 16/29 (2019.01)

(52) U.S. Cl.
CPC ......... G01C 21/3815 (2020.08); G06F 16/29 (2019.01)

(58) Field of Classification Search
CPC .. G01C 21/3815; G01C 21/30; G01C 21/343; G01C 21/3885; G06Q 50/30; G06Q 10/047; G08G 1/0125
See application file for complete search history.

(56) References Cited

U.S. PATENT DOCUMENTS

2015/0300835 A1* 10/2015 Fowe .................... G08G 1/012
701/410
2017/0109764 A1 4/2017 Tripathi et al.
(Continued)

FOREIGN PATENT DOCUMENTS

CN          101162148 A      4/2008
CN          101819717 A      9/2010
(Continued)

OTHER PUBLICATIONS

Extended European Search Report for European Patent Application 22157646.5, issued by the European Patent Office dated May 18, 2022.
(Continued)

Primary Examiner — Mary Cheung
(74) Attorney, Agent, or Firm — Ladas & Parry, LLP

(57) ABSTRACT

The present disclosure provides an intelligent transportation road network acquisition method and apparatus, an electronic device and a storage medium, and relates to the field of artificial intelligence such as intelligent transportation. The method includes: acquiring a target demand set; acquiring annotation information, the annotation information being microscopic road network attribute information manually annotated on a displayed map road network for intersections in the target demand set; acquiring macroscopic road network information corresponding to the target demand set from road network data corresponding to the map road network; and generating an intelligent transportation road network corresponding to the target demand set according to the annotation information and the macroscopic road network information. The intelligent transportation road network meeting requirements of intelligent transportation service scenarios can be obtained accurately and
(Continued)

efficiently by using the solutions according to the present disclosure.

20 Claims, 3 Drawing Sheets

(56) References Cited

U.S. PATENT DOCUMENTS

| | | | |
|---|---|---|---|
| 2020/0201357 | A1 | 6/2020 | Zeng et al. |
| 2020/0239031 | A1 | 7/2020 | Ran et al. |
| 2020/0242930 | A1* | 7/2020 | Ran .................... G08G 1/22 |
| 2020/0378773 | A1 | 12/2020 | Lehoux-Lebacque et al. |
| 2021/0311491 | A1* | 10/2021 | Li ........................ G08G 1/0116 |
| 2022/0018667 | A1 | 1/2022 | Al-Dujaili et al. |
| 2022/0215749 | A1 | 7/2022 | Laraki et al. |

FOREIGN PATENT DOCUMENTS

| | | |
|---|---|---|
| CN | 103531024 A | 1/2014 |
| CN | 103593535 A | 2/2014 |
| CN | 105374204 A | 3/2016 |
| CN | 105374209 A | 3/2016 |
| CN | 106096798 A | 11/2016 |
| CN | 107622665 A | 1/2018 |
| CN | 109976332 A | 7/2019 |
| CN | 110765227 A | 2/2020 |
| CN | 110768819 A | 2/2020 |
| CN | 10992681 A | 4/2020 |
| CN | 111044058 A | 4/2020 |
| CN | 111415510 A | 7/2020 |
| CN | 111985107 A | 11/2020 |
| CN | 112069636 A | 12/2020 |
| CN | 112100311 A | 12/2020 |
| CN | 112629558 A | 4/2021 |
| EP | 3745331 A1 | 2/2020 |
| JP | 2007010905 A | 1/2007 |
| WO | 2020106211 A1 | 5/2020 |

OTHER PUBLICATIONS

First Office Action and search report for the corresponding Chinese Patent Application No. 202110687714.4 dated May 6, 2023, and its English Translation provided by Google Translate.

Notice of Reason for Rejection for the corresponding Japanese Patent Application No. 2022-025607 dated Mar. 22, 2023, and its English Translation provided by Google Translate.

"Dynamic Road Network Description Model for Path Planning System", Song Yan, Shi Jianjun, Xu Guohua, Computer and Communications, vol. 22, No. 5, Dec. 31, 2004, machine translation by Google translate.

Notice of Allowance from the corresponding Chinese Patent Application No. 202110687714A dated Aug. 22, 2023 with search report, with machine English translation using Google Translate.

* cited by examiner

INTELLIGENT TRANSPORTATION ROAD NETWORK ACQUISITION METHOD AND APPARATUS, ELECTRONIC DEVICE AND STORAGE MEDIUM

The present application claims the priority of Chinese Patent Application No. 202110687714.4, filed on Jun. 21, 2021, with the title of "INTELLIGENT TRANSPORTATION ROAD NETWORK ACQUISITION METHOD AND APPARATUS, ELECTRONIC DEVICE AND STORAGE MEDIUM". The disclosure of the above application is incorporated herein by reference in its entirety.

FIELD OF THE DISCLOSURE

The present disclosure relates to the field of artificial intelligence technologies, and in particular, to an intelligent transportation road network acquisition method and apparatus, an electronic device and a storage medium.

BACKGROUND OF THE DISCLOSURE

At present, common map road networks generally include a large number of information not required by transportation control, such as POI (Point of Interest) information. Such information is not necessary for intelligent transportation service scenarios, and lacks some micro information required by the intelligent transportation service scenarios. Therefore, the current map road networks are not suitable for the intelligent transportation service scenarios.

SUMMARY OF THE DISCLOSURE

The present disclosure provides an intelligent transportation road network acquisition method and apparatus, an electronic device and a storage medium.

A method, including:
acquiring a target demand set;
acquiring annotation information, the annotation information being microscopic road network attribute information manually annotated on a displayed map road network for intersections in the target demand set;
acquiring macroscopic road network information corresponding to the target demand set from road network data corresponding to the map road network; and
generating an intelligent transportation road network corresponding to the target demand set according to the annotation information and the macroscopic road network information.

An electronic device, including:
at least one processor; and
a memory communicatively connected with the at least one processor;
wherein the memory stores instructions executable by the at least one processor, and the instructions are executed by the at least one processor to enable the at least one processor to perform a method, wherein the method includes:
acquiring a target demand set;
acquiring annotation information, the annotation information being microscopic road network attribute information manually annotated on a displayed map road network for intersections in the target demand set;
acquiring macroscopic road network information corresponding to the target demand set from road network data corresponding to the map road network; and
generating an intelligent transportation road network corresponding to the target demand set according to the annotation information and the macroscopic road network information.

A non-transitory computer readable storage medium with computer instructions stored thereon, wherein the computer instructions are used for causing a computer to perform a method, wherein the method includes:
acquiring a target demand set;
acquiring annotation information, the annotation information being microscopic road network attribute information manually annotated on a displayed map road network for intersections in the target demand set;
acquiring macroscopic road network information corresponding to the target demand set from road network data corresponding to the map road network; and
generating an intelligent transportation road network corresponding to the target demand set according to the annotation information and the macroscopic road network information.

One embodiment in the above disclosure has the following advantages or beneficial effects. A required intelligent transportation road network may be generated in combination with microscopic road network attribute information manually annotated at intersections and macroscopic road network information acquired from road network data corresponding to a map road network, so as to accurately and efficiently acquire an intelligent transportation road network meeting requirements of intelligent transportation service scenarios.

It should be understood that the content described in this part is neither intended to identify key or significant features of the embodiments of the present disclosure, nor intended to limit the scope of the present disclosure. Other features of the present disclosure will be made easier to understand through the following description.

BRIEF DESCRIPTION OF DRAWINGS

The accompanying drawings are intended to provide a better understanding of the solutions and do not constitute a limitation on the present disclosure. In the drawings.

DETAILED DESCRIPTION OF PREFERRED EMBODIMENTS

Exemplary embodiments of the present disclosure are illustrated below with reference to the accompanying drawings, which include various details of the present disclosure to facilitate understanding and should be considered only as exemplary. Therefore, those of ordinary skill in the art should be aware that various changes and modifications can be made to the embodiments described herein without departing from the scope and spirit of the present disclosure.

Similarly, for clarity and simplicity, descriptions of well-known functions and structures are omitted in the following description.

In addition, it shall be understood that the term "and/or" herein is merely an association relationship describing associated objects, indicating that three relationships may exist. For example, A and/or B indicates that there are three cases of A alone, A and B together, and B alone. In addition, the character "/" herein generally means that associated objects before and after it are in an "or" relationship.

Figure 1:
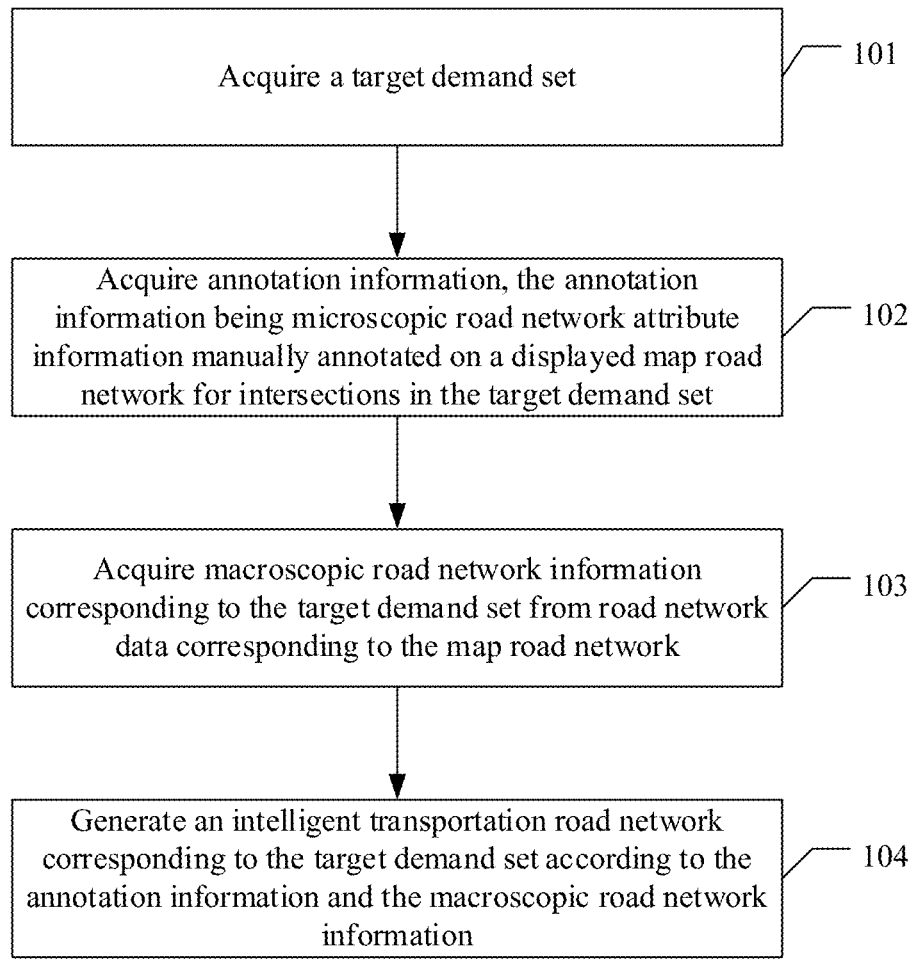
FIG. 1 is a flowchart of a first embodiment of an intelligent transportation road network acquisition method according to the present disclosure.

FIG. 1 is a flowchart of a first embodiment of an intelligent transportation road network acquisition method according to the present disclosure. As shown in FIG. 1, the following specific implementations are included.

In step 101, a target demand set is acquired.

In step 102, annotation information is acquired, the annotation information being microscopic road network attribute information manually annotated on a displayed map road network for intersections in the target demand set.

In step 103, macroscopic road network information corresponding to the target demand set is acquired from road network data corresponding to the map road network.

In step 104, an intelligent transportation road network corresponding to the target demand set is generated according to the annotation information and the macroscopic road network information.

As can be seen, in the solutions described in the above method embodiment, a required intelligent transportation road network may be generated in combination with microscopic road network attribute information manually annotated at intersections and macroscopic road network information acquired from road network data corresponding to a map road network, so as to accurately and efficiently acquire an intelligent transportation road network meeting requirements of intelligent transportation service scenarios.

The target demand set may include: regions, intersections and arteries, that is, to-be-modeled regions, intersections and arteries. The arteries refer to line structures composed of a plurality of sections connected by a plurality of intersections.

The target demand set may be manually determined/set. Assuming that a region in the target demand set is a region a (such as a whole urban region of Beijing), the intersections and the arteries in the target demand set are all required to be located in the region a. Moreover, the intersections in the target demand set may include all intersections in the region a or only some intersections in the region a. Similarly, the arteries in the target demand set may include all arteries in the region a or only some arteries in the region a.

For the intersections in the target demand set, corresponding survey information may be acquired. The survey information includes microscopic road network attribute information of the intersections. Assuming that the target demand set includes 10 intersections, survey information corresponding to the 10 intersections is required to be acquired respectively.

The acquired survey information may include:

1) survey information acquired from a street view map; and
2) survey information generated manually from field survey.

The acquired survey information may include a survey sheet and/or a survey picture. The survey sheet refers to microscopic road network attribute information recorded in a form of text. The survey picture refers to a captured intersection picture, which records microscopic road network attribute information in a form of picture.

In the manner 1), the required survey information may be acquired from a street view map. For example, the survey picture may be acquired from the street view map, and the survey picture may be obtained through a technology such as picture recognition. In the manner 2), field survey may be performed by a special surveyor in accordance with a survey standard, to obtain the survey sheet and the survey picture.

In the manner 1), automatic survey may be realized, thereby saving labor and time costs. However, timeliness of the street view map cannot be guaranteed, which may lead to inaccurate survey information (including outdated information). In the manner 2), although some labor and time costs are required, the acquired survey information is generally more accurate. In practical application, a specific manner used may be determined according to an actual requirement.

Correspondingly, annotation information may be acquired. The annotation information is microscopic road network attribute information manually annotated on a displayed map road network for intersections in the target demand set. For any intersection in the target demand set, microscopic road network attribute information manually annotated according to survey information corresponding to the intersection may be acquired.

Assuming that the target demand set includes 10 intersections, namely Intersection 1 to Intersection 10 respectively, taking Intersection 1 as an example, it may be manually annotated in the following manner. For an editing interface of the map road network shown, such as an editing interface of Baidu map road network of a web version shown, Intersection 1 may be selected first. Then, microscopic road network attribute information of Intersection 1 may be manually annotated according to survey information corresponding to Intersection 1. The microscopic road network attribute information may include: exits and entrances, branches, lanes (numbers, orders, steering, whether to be a variable lane, whether to be a tidal lane, whether to be an extended lane, etc.) and flow directions, etc. Specific contents included may be determined according to actual requirements. In addition, how to make annotations is not limited. Other intersections may also be processed in a same manner as Intersection 1.

In the above processing manner, by means of the survey information corresponding to the intersections, the microscopic road network attribute information of the intersections may be accurately and efficiently annotated, thereby laying a good foundation for the subsequent processing.

In addition to acquiring the annotation information, macroscopic road network information corresponding to the target demand set may also be acquired from road network data corresponding to the map road network.

In the solution according to the present disclosure, the microscopic road network attribute information of the intersections are required to be manually annotated, while the macroscopic road network information of other sections, arteries and regions may be acquired from the road network data corresponding to the map road network.

That is, according to the target demand set, the required macroscopic road network information may be determined according to the road network data corresponding to the map road network. Specific implementation thereof is a prior art.

One section may correspond to a plurality of intersections, for example, two sections located at starting positions. A plurality of sections may form an artery, and a plurality of intersections, plurality of sections and a plurality of arteries form a region.

After the annotation information and the macroscopic road network information are acquired respectively, an intelligent transportation road network corresponding to the target demand set may be generated in combination with the two.

In addition, manual review and revision results of the annotation information may also be acquired, and the intelligent transportation road network corresponding to the target demand set is generated according to revised annotation information; and/or manual review and revision results of the macroscopic road network information is acquired, and the intelligent transportation road network corresponding to the target demand set is generated according to revised macroscopic road network information.

That is, before the intelligent transportation road network corresponding to the target demand set is generated, the annotation information may be manually reviewed and revised first, and the intelligent transportation road network corresponding to the target demand set may be then generated according to the revised annotation information and the macroscopic road network information. Alternatively, the macroscopic road network information may be manually reviewed and revised first, and the intelligent transportation road network corresponding to the target demand set may be then generated according to the annotation information and the revised macroscopic road network information. Alternatively, the annotation information and the macroscopic road network information may be manually reviewed and revised respectively, and the intelligent transportation road network corresponding to the target demand set may be then generated according to the revised annotation information and the revised macroscopic road network information.

In practical application, the annotation information and/or the macroscopic road network information may be manually reviewed and revised by combining the target demand set, the survey information corresponding to the intersections, etc.

Through the above processing, more accurate annotation information and/or macroscopic road network information may be obtained, thereby improving the accuracy of the intelligent transportation road network subsequently generated.

How to generate the intelligent transportation road network is not limited. In the solution according to the present disclosure, a road network output file of a nested road network structure may be generated.

The nested road network structure may fully express upstream and downstream relationships between sections and intersections, upstream and downstream relationships between sections and branches, upstream and downstream relationships between intersections, parent-child relationships between branches and lanes, etc. That is, spatial nested inclusion relationships between arteries, sections, intersections, branches and lanes may be fully expressed.

The step of generating a road network output file of a nested road network structure may include: generating a road network output file in a JavaScript Object Notation (JSON) format; or generating a road network output file in a ProtoBuffer binary format; or generating a road network output file in a ProtoBuffer text format.

That is, the road network output file may be in the JSON format or in the ProtoBuffer binary format. The specific format used may be determined according to an actual requirement. Different formats have their own characteristics. For example, the ProtoBuffer binary format has encryption properties, which cannot be cracked when an unknown proto defines a file. Moreover, the file has high compressibility and is easy to transfer.

Figure 2:
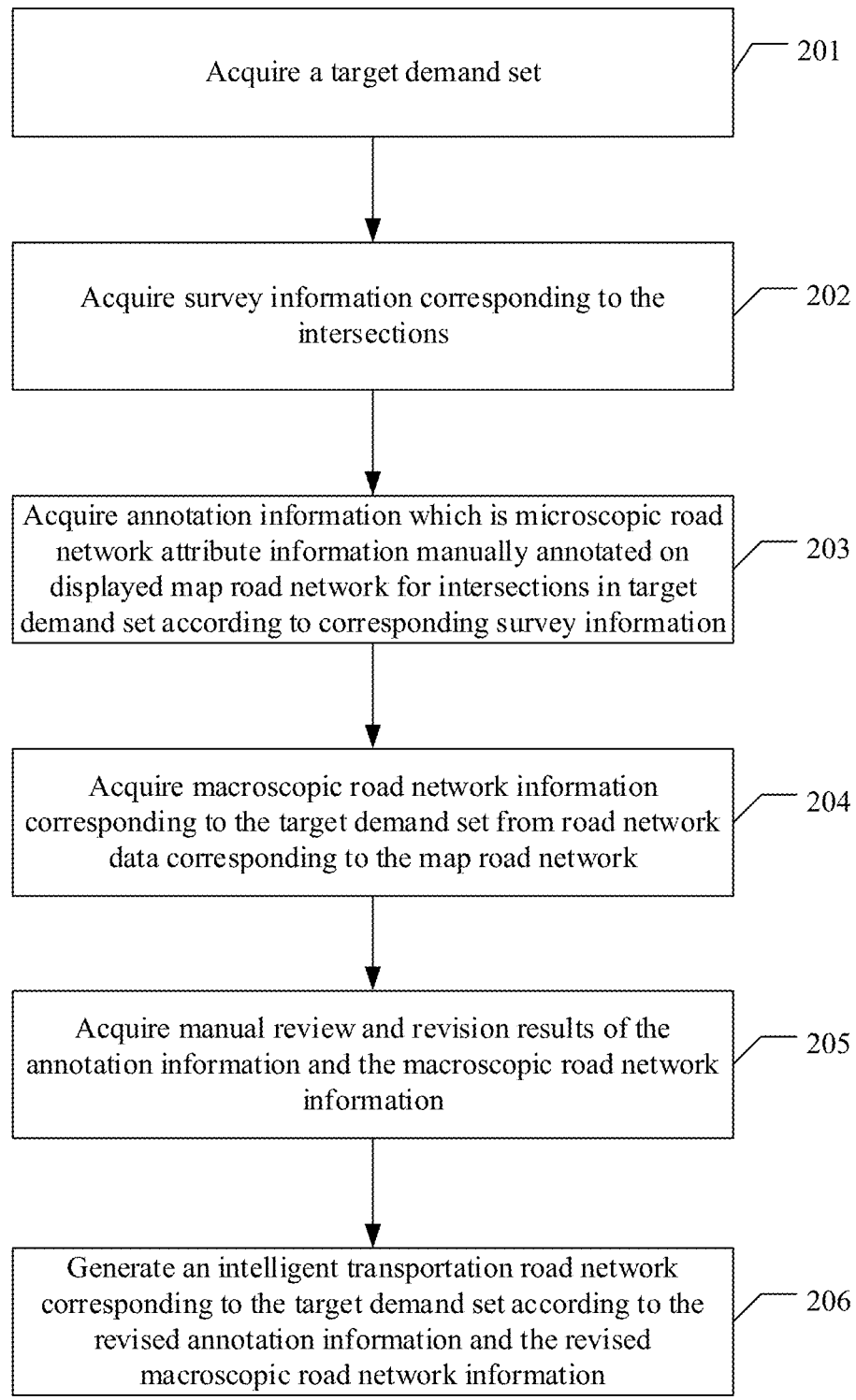
FIG. 2 is a flowchart of a second embodiment of the intelligent transportation road network acquisition method according to the present disclosure.

Based on the above introduction, FIG. 2 is a flowchart of a second embodiment of the intelligent transportation road network acquisition method according to the present disclosure. As shown in FIG. 2, the following specific implementations are included.

In step 201, a target demand set is acquired.

The target demand set may include: regions, intersections and arteries.

In step 202, survey information corresponding to the intersections in the target demand set is acquired.

The survey information may include a survey sheet and/or a survey picture. In this embodiment, it is assumed that the survey information is automatically acquired from a street view map.

In step 203, annotation information is acquired, the annotation information being microscopic road network attribute information manually annotated on the displayed map road network for the intersections in the target demand set according to the survey information corresponding to the intersections.

That is, microscopic road network attribute information manually annotated at the intersections in the target demand set is acquired.

In step 204, macroscopic road network information corresponding to the target demand set is acquired from road network data corresponding to the map road network.

That is, according to the target demand set, the required macroscopic road network information may be determined according to the road network data corresponding to the map road network.

In step 205, manual review and revision results of the annotation information and the macroscopic road network information are acquired.

The annotation information and the macroscopic road network information may be manually reviewed and revised by combining the target demand set, the survey information corresponding to the intersections, etc.

In step 206, an intelligent transportation road network corresponding to the target demand set is generated according to the revised annotation information and the revised macroscopic road network information.

For example, the step of generating a road network output file of a nested road network structure includes: generating a road network output file in a JSON format, or generating a road network output file in a ProtoBuffer binary format, or generating a road network output file in a ProtoBuffer text format, etc.

How to use the intelligent transportation road network subsequently is a prior art.

It is to be noted that for the sake of simplicity, the method embodiments described above are described as a combination of a series of actions. However, those of ordinary skill in the art should understand that the present disclosure is not limited by the order of action described. Therefore, according to the present disclosure, some steps may be performed in another order or at the same time. Secondly, those of ordinary skill in the art should also know that the embodiments described in the specification are preferred embodiments, and the actions and modules involved are not necessary to the present disclosure. In addition, the parts not detailed in one embodiment may be obtained with reference to relevant descriptions in other embodiments.

The above is the introduction to the method embodiments. The following is a further illustration of the solutions according to the present disclosure through apparatus embodiments.

Figure 3:
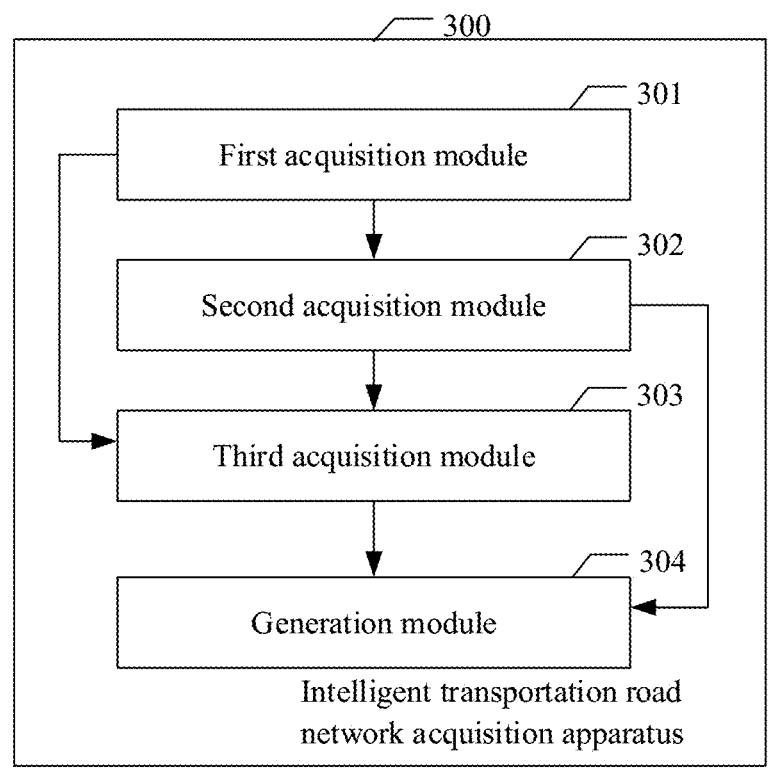
FIG. 3 is a schematic diagram of composition of an embodiment of an intelligent transportation road network acquisition apparatus 300 according to the present disclosure.

FIG. 3 is a schematic structural diagram of an embodiment of an intelligent transportation road network acquisition apparatus 300 according to the present disclosure. As shown in FIG. 3, the apparatus includes: a first acquisition module 301, a second acquisition module 302, a third acquisition module 303 and a generation module 304.

The first acquisition module 301 is configured to acquire a target demand set.

The second acquisition module 302 is configured to acquire annotation information, the annotation information being microscopic road network attribute information manually annotated on a displayed map road network for intersections in the target demand set.

The third second acquisition module 303 is configured to acquire macroscopic road network information corresponding to the target demand set from road network data corresponding to the map road network.

The generation module 304 is configured to generate an intelligent transportation road network corresponding to the target demand set according to the annotation information and the macroscopic road network information.

The target demand set may include: regions, intersections and arteries, that is, to-be-modeled regions, intersections and arteries.

The target demand set may be manually determined/set. Assuming that a region in the target demand set is a region a, the intersections and the arteries in the target demand set are all required to be located in the region a. Moreover, the intersections in the target demand set may include all intersections in the region a or only some intersections in the region a. Similarly, the arteries in the target demand set may include all arteries in the region a or only some arteries in the region a.

For the intersections in the target demand set, corresponding survey information may be acquired. The survey information may include microscopic road network attribute information of the intersections.

The acquired survey information may include: survey information acquired from a street view map or survey information generated manually from field survey.

The acquired survey information may include a survey sheet and/or a survey picture. The survey sheet refers to microscopic road network attribute information recorded in a form of text. The survey picture refers to a captured intersection picture, which records microscopic road network attribute information in a form of picture.

Correspondingly, the second acquisition module 302 may acquire annotation information, the annotation information being microscopic road network attribute information manually annotated on a displayed map road network for intersections in the target demand set. For any intersection in the target demand set, microscopic road network attribute information manually annotated according to survey information corresponding to the intersection may be acquired.

In addition, the third second acquisition module 303 may acquire macroscopic road network information corresponding to the target demand set from road network data corresponding to the map road network. That is, according to the target demand set, the required macroscopic road network information may be determined according to the road network data corresponding to the map road network.

After the annotation information and the macroscopic road network information are acquired respectively, the generation module 304 may generate an intelligent transportation road network corresponding to the target demand set in combination with the two.

In addition, the generation module 304 may also acquire manual review and revision results of the annotation information, and generate the intelligent transportation road network corresponding to the target demand set according to revised annotation information; and/or acquire manual review and revision results of the macroscopic road network information, and generate the intelligent transportation road network corresponding to the target demand set according to revised macroscopic road network information.

In practical application, the annotation information and/or the macroscopic road network information may be manually reviewed and revised by combining the target demand set, the survey information corresponding to the intersections, etc.

In addition, the generation module 304 generates a road network output file of a nested road network structure. For example, a road network output file in a JSON format may be generated, or a road network output file in a ProtoBuffer binary format may be generated, or a road network output file in a ProtoBuffer text format may be generated, etc.

The specific workflow of the apparatus embodiment shown in FIG. 3 can be obtained with reference to the related description in the above method embodiment and is not repeated.

In conclusion, by use of the solution of the apparatus embodiment of the present disclosure, the intelligent transportation road network meeting requirements of intelligent transportation service scenarios can be obtained accurately and efficiently.

The solutions according to the present disclosure may be applied to the field of artificial intelligence, and in particular, to the field of, for example, intelligent transportation. Artificial intelligence is a discipline that studies how to make computers simulate certain thinking processes and intelligent behaviors (such as learning, reasoning, thinking and planning) of human beings, which includes hardware technologies and software technologies. The artificial intelligence hardware technologies generally include sensors, dedicated artificial intelligence chips, cloud computing, distributed storage, big data processing and other technologies. The artificial intelligence software technologies mainly include a computer vision technology, a speech recognition technology, a natural language processing technology, machine learning/deep learning, a big data processing technology, a knowledge graph technology and other major directions.

According to embodiments of the present disclosure, the present disclosure further provides an electronic device, a readable storage medium and a computer program product.

Figure 4:
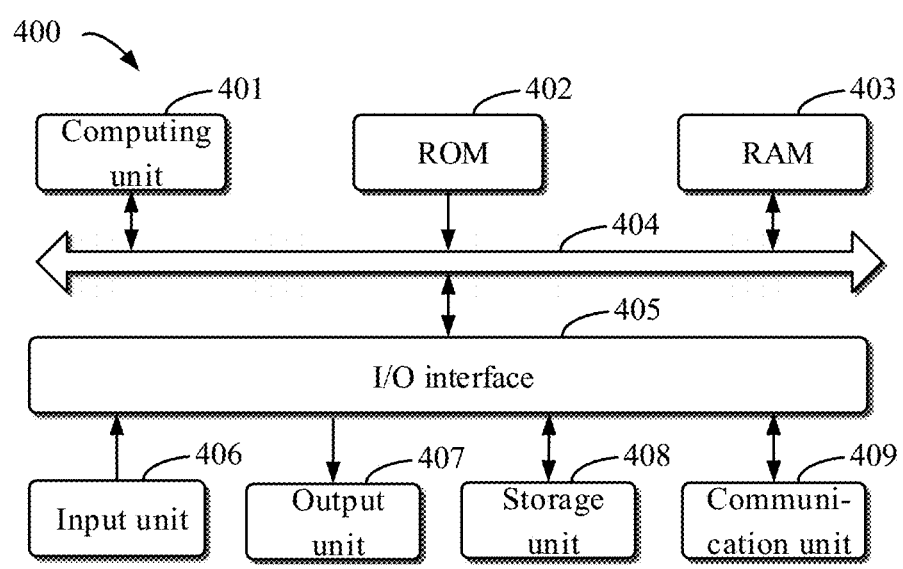
FIG. 4 is a schematic block diagram of an exemplary electronic device 400 that may be configured to implement embodiments of the present disclosure.

FIG. 4 is a schematic block diagram of an exemplary electronic device 400 configured to implement embodiments of the present disclosure. The electronic device is intended to represent various forms of digital computers, such as laptops, desktops, workbenches, personal digital assistants, servers, blade servers, mainframe computers and other suitable computing devices. The electronic device may further represent various forms of mobile devices, such as personal digital assistants, cellular phones, smart phones, wearable devices and other similar computing devices. The components, their connections and relationships, and their functions shown herein are examples only, and are not intended to limit the implementation of the present disclosure as described and/or required herein.

As shown in FIG. 4, the device 400 includes a computing unit 401, which may perform various suitable actions and processing according to a computer program stored in a read-only memory (ROM) 402 or a computer program loaded from a storage unit 408 into a random access memory (RAM) 403. The RAM 403 may also store various programs and data required to operate the device 400. The computing unit 401, the ROM 402 and the RAM 403 are connected to one another by a bus 404. An input/output (I/O) interface 405 is also connected to the bus 404.

A plurality of components in the device 400 are connected to the I/O interface 405, including an input unit 406, such as a keyboard and a mouse; an output unit 407, such as various displays and speakers; a storage unit 408, such as disks and discs; and a communication unit 409, such as a network card, a modem and a wireless communication transceiver. The communication unit 409 allows the device 400 to exchange information/data with other devices over computer networks such as the Internet and/or various telecommunications networks.

The computing unit 401 may be a variety of general-purpose and/or special-purpose processing components with processing and computing capabilities. Some examples of the computing unit 401 include, but are not limited to, a central processing unit (CPU), a graphics processing unit (GPU), various artificial intelligence (AI) computing chips, various computing units that run machine learning model algorithms, a digital signal processor (DSP), and any appropriate processor, controller or microcontroller, etc. The computing unit 401 performs the methods and processing described above, such as the method described in the present disclosure. For example, in some embodiments, the method described in the present disclosure may be implemented as a computer software program that is tangibly embodied in a machine-readable medium, such as the storage unit 408. In some embodiments, part or all of a computer program may be loaded and/or installed on the device 400 via the ROM 402 and/or the communication unit 409. One or more steps of the method described in the present disclosure may be performed when the computer program is loaded into the RAM 403 and executed by the computing unit 401. Alternatively, in other embodiments, the computing unit 401 may be configured to perform the method described in the present disclosure by any other appropriate means (for example, by means of firmware).

Various implementations of the systems and technologies disclosed herein can be realized in a digital electronic circuit system, an integrated circuit system, a field programmable gate array (FPGA), an application-specific integrated circuit (ASIC), an application-specific standard product (ASSP), a system on chip (SOC), a load programmable logic device (CPLD), computer hardware, firmware, software, and/or combinations thereof. Such implementations may include implementation in one or more computer programs that are executable and/or interpretable on a programmable system including at least one programmable processor, which can be special or general purpose, configured to receive data and instructions from a storage system, at least one input apparatus, and at least one output apparatus, and to transmit data and instructions to the storage system, the at least one input apparatus, and the at least one output apparatus.

Program codes configured to implement the methods in the present disclosure may be written in any combination of one or more programming languages. Such program codes may be supplied to a processor or controller of a general-purpose computer, a special-purpose computer, or another programmable data processing apparatus to enable the function/operation specified in the flowchart and/or block diagram to be implemented when the program codes are executed by the processor or controller. The program codes may be executed entirely on a machine, partially on a machine, partially on a machine and partially on a remote machine as a stand-alone package, or entirely on a remote machine or a server.

In the context of the present disclosure, machine-readable media may be tangible media which may include or store programs for use by or in conjunction with an instruction execution system, apparatus or device. The machine-readable media may be machine-readable signal media or machine-readable storage media. The machine-readable media may include, but are not limited to, electronic, magnetic, optical, electromagnetic, infrared, or semiconductor systems, apparatuses or devices, or any suitable combinations thereof. More specific examples of machine-readable storage media may include electrical connections based on one or more wires, a portable computer disk, a hard disk, a random access memory (RAM), a read-only memory (ROM), an erasable programmable read only memory (EPROM or flash memory), an optical fiber, a compact disk read only memory (CD-ROM), an optical storage device, a magnetic storage device, or any suitable combination thereof.

To provide interaction with a user, the systems and technologies described here can be implemented on a computer. The computer has: a display apparatus (e.g., a cathode-ray tube (CRT) or a liquid crystal display (LCD) monitor) for displaying information to the user; and a keyboard and a pointing apparatus (e.g., a mouse or trackball) through which the user may provide input for the computer. Other kinds of apparatuses may also be configured to provide interaction with the user. For example, a feedback provided for the user may be any form of sensory feedback (e.g., visual, auditory, or tactile feedback); and input from the user may be received in any form (including sound input, voice input, or tactile input).

The systems and technologies described herein can be implemented in a computing system including background components (e.g., as a data server), or a computing system including middleware components (e.g., an application server), or a computing system including front-end components (e.g., a user computer with a graphical user interface or web browser through which the user can interact with the implementation mode of the systems and technologies described here), or a computing system including any combination of such background components, middleware components or front-end components. The components of the system can be connected to each other through any form or medium of digital data communication (e.g., a communication network). Examples of the communication network include: a local area network (LAN), a wide area network (WAN) and the Internet.

The computer system may include a client and a server. The client and the server are generally far away from each other and generally interact via the communication network. A relationship between the client and the server is generated through computer programs that run on a corresponding computer and have a client-server relationship with each other. The server may be a cloud server, also known as a cloud computing server or cloud host, which is a host product in the cloud computing service system to solve the problems of difficult management and weak business scalability in the traditional physical host and a virtual private server (VPS). The server may also be a distributed system server, or a server combined with blockchain. Cloud computing refers to a technical system that is connected to an elastic and scalable shared physical or virtual resource pool over a network and may deploy and manage resources on demand and in a self-service manner. The resources include servers, operating systems, networks, software, applications, storage devices, and so on. Through a cloud computing technology, efficient and powerful data processing capabilities can be provided for technical applications, such as artificial intelligence and blockchain, and model training.

It should be understood that the steps can be reordered, added, or deleted using the various forms of processes shown above. For example, the steps described in the present disclosure may be executed in parallel or sequentially or in different sequences, provided that desired results of the technical solutions disclosed in the present disclosure are achieved, which is not limited herein.

The above specific implementations do not limit the extent of protection of the present disclosure. Those skilled in the art should understand that various modifications, combinations, sub-combinations, and replacements can be made according to design requirements and other factors. Any modifications, equivalent substitutions and improvements made within the spirit and principle of the present disclosure all should be included in the extent of protection of the present disclosure.

What is claimed is:

1. A method, comprising:
acquiring a target demand set;
acquiring annotation information, the annotation information being microscopic road network attribute information manually annotated on a displayed map road network for intersections in the target demand set;
acquiring macroscopic road network information corresponding to the target demand set from road network data corresponding to the map road network; and
generating an intelligent transportation road network corresponding to the target demand set according to the annotation information and the macroscopic road network information.

2. The method according to claim 1, wherein
the target demand set comprises: regions, intersections and arteries.

3. The method according to claim 2, wherein
the step of generating an intelligent transportation road network corresponding to the target demand set comprises: generating a road network output file of a nested road network structure.

4. The method according to claim 1, wherein
the microscopic road network attribute information of any intersection in the target demand set comprises: microscopic road network attribute information annotated according to survey information corresponding to the intersection.

5. The method according to claim 4, wherein
the step of generating an intelligent transportation road network corresponding to the target demand set comprises: generating a road network output file of a nested road network structure.

6. The method according to claim 4, wherein
the survey information comprises: survey information acquired from a street view map or survey information generated manually from field survey.

7. The method according to claim 6, wherein
the step of generating an intelligent transportation road network corresponding to the target demand set comprises: generating a road network output file of a nested road network structure.

8. The method according to claim 1, further comprising:
acquiring manual review and revision results of the annotation information, and generating the intelligent transportation road network according to revised annotation information;
and/or acquiring manual review and revision results of the macroscopic road network information, and generating the intelligent transportation road network according to revised macroscopic road network information.

9. The method according to claim 8, wherein
the step of generating an intelligent transportation road network corresponding to the target demand set comprises: generating a road network output file of a nested road network structure.

10. The method according to claim 1, wherein
the step of generating an intelligent transportation road network corresponding to the target demand set comprises: generating a road network output file of a nested road network structure.

11. The method according to claim 10, wherein the step of generating a road network output file of a nested road network structure comprises:
generating a road network output file in a JavaScript Object Notation (JSON) format;
or generating a road network output file in a ProtoBuffer binary format;
or generating a road network output file in a ProtoBuffer text format.

12. An electronic device, comprising:
at least one processor; and
a memory communicatively connected with the at least one processor;
wherein the memory stores instructions executable by the at least one processor, and the instructions are executed by the at least one processor to enable the at least one processor to perform a method, wherein the method comprises:
acquiring a target demand set;
acquiring annotation information, the annotation information being microscopic road network attribute information manually annotated on a displayed map road network for intersections in the target demand set;
acquiring macroscopic road network information corresponding to the target demand set from road network data corresponding to the map road network; and
generating an intelligent transportation road network corresponding to the target demand set according to the annotation information and the macroscopic road network information.

13. The electronic device according to claim 12, wherein
the target demand set comprises: regions, intersections and arteries.

14. The electronic device according to claim 13, wherein
the step of generating an intelligent transportation road network corresponding to the target demand set comprises: generating a road network output file of a nested road network structure.

15. The electronic device according to claim 12, wherein
the microscopic road network attribute information of any intersection in the target demand set comprises: microscopic road network attribute information annotated according to survey information corresponding to the intersection.

16. The electronic device according to claim 15, wherein
the survey information comprises:
survey information acquired from a street view map;

or survey information generated manually from field survey.

17. The electronic device according to claim 12, further comprising:
acquiring manual review and revision results of the annotation information, and generate the intelligent transportation road network according to revised annotation information; and/or acquiring manual review and revision results of the macroscopic road network information, and generate the intelligent transportation road network according to revised macroscopic road network information.

18. The electronic device according to claim 12, wherein the step of generating an intelligent transportation road network corresponding to the target demand set comprises: generating a road network output file of a nested road network structure.

19. The electronic device according to claim 18, wherein the step of generating a road network output file of a nested road network structure comprises:
generating a road network output file in a JavaScript Object Notation (JSON) format;
or generating a road network output file in a ProtoBuffer binary format;
or generating a road network output file in a ProtoBuffer text format.

20. A non-transitory computer readable storage medium with computer instructions stored thereon, wherein the computer instructions are used for causing a computer to perform a method, wherein the method comprises:
acquiring a target demand set;
acquiring annotation information, the annotation information being microscopic road network attribute information manually annotated on a displayed map road network for intersections in the target demand set;
acquiring macroscopic road network information corresponding to the target demand set from road network data corresponding to the map road network; and
generating an intelligent transportation road network corresponding to the target demand set according to the annotation information and the macroscopic road network information.

* * * * *